United States Patent [19]

Moritomo et al.

[11] 4,116,506
[45] Sep. 26, 1978

[54] PRELOADED BEARING

[75] Inventors: Sadao Moritomo; Shigenori Ando, both of Narashino, Japan

[73] Assignee: Seiko Seiki Kabushiki Kaisha, Japan

[21] Appl. No.: 791,773

[22] Filed: Apr. 28, 1977

[30] Foreign Application Priority Data

Apr. 30, 1976 [JP] Japan .................... 51-56051[U]

[51] Int. Cl.$^2$ .................... F16C 33/16; F16C 35/12
[52] U.S. Cl. .................... 308/189 A; 308/184 R; 308/187; 308/DIG. 13
[58] Field of Search .................... 308/9, 122, 173, 174, 308/178, 184 R, 187, 189 A, 232, 233, DIG. 13; 184/6.1, 6.14; 82/30; 51/134.5 R, 134.5 F

[56] References Cited

U.S. PATENT DOCUMENTS

| 1,242,153 | 10/1917 | Dickerhoof | 308/189 A |
| 3,664,718 | 5/1972 | Uhtenwoldt | 308/189 A |
| 3,943,803 | 3/1976 | Hafla | 308/189 A |
| 4,006,944 | 2/1977 | Ando et al. | 308/187 |

FOREIGN PATENT DOCUMENTS 572,384  10/1945  United Kingdom .................... 308/122

*Primary Examiner*—Trygve M. Blix
*Assistant Examiner*—Charles E. Frankfort
*Attorney, Agent, or Firm*—Robert E. Burns; Emmanuel J. Lobato; Bruce L. Adams

[57] ABSTRACT

A preloaded bearing comprises a spindle which is rotatably supported in the bore of a housing by a pair of ball bearings near one end of the bore and a second pair of ball bearings near the other end of the bore. One pair of ball bearings is axially slidable in the bore and is preloaded by a compression spring acting between the bearings and an abutment in the bore. The spindle is driven by a belt which runs on a pulley at one end of the bore and thereby subjects the spindle to a radial load. A recess is provided in the wall of the bore on the radially loaded side of the slidable pair of bearings and pressurized fluid is supplied to the recess so as to exert fluid pressure in a direction opposing the load applied by the belt. The pressurized fluid is preferably lubricating oil and is supplied not only to the recesses but also to the bearings in order to lubricate them.

5 Claims, 2 Drawing Figures

PRELOADED BEARING

FIELD OF INVENTION

The present invention relates to bearings and particularly to preloaded bearings for rotatably supporting a spindle that is subjected to radial load.

BACKGROUND OF THE INVENTION

In order to provide a suitably preload on the running bearings such as antifriction bearings in a spindle device, for example the grinding wheel spindle head for an internal grinder, bearings at one end of the spindle are slidable in a longitudinal direction in the housing and the preload is applied to them by means of spring force or the like. When the rotary spindle elongates somewhat by reason of thermal expansion due to the heat generated by the spindle rotation, the slidable bearing moves longitudinally to compensate for the elongation and thereby maintains a suitable preload.

However, this structure has the defect that the slidable bearing does not slide freely so as to compensate for thermal expansion because of excessive friction force on the sliding surfaces of the bearing and housing in case a high radial load is applied to the rotary spindle, for example by means of a belt by which the spindle is driven.

SUMMARY OF THE INVENTION

It is an object of the present invention to provide a spindle device in which the above defect is eliminated by providing a recess in the housing bore surface against which the slidable bearing is pressed by the radial load and supplying pressurized fluid to the recess so as to provide for easy sliding of the bearing without excessive frictional forces even in case of a very high radial load being applied to the spindle. The pressurized fluid is preferably bearing lubricating fluid, for example lubricating oil which is applied not only to the recess but also to the bearings so as to lubricate them.

BRIEF DESCRIPTION OF DRAWINGS

The nature, objects and advantages of the invention will be more fully understood from the following description of a preferred embodiment illustrated by way of example in the accompanying drawings in which.

DESCRIPTION OF PREFERRED EMBODIMENT

Figure 1:
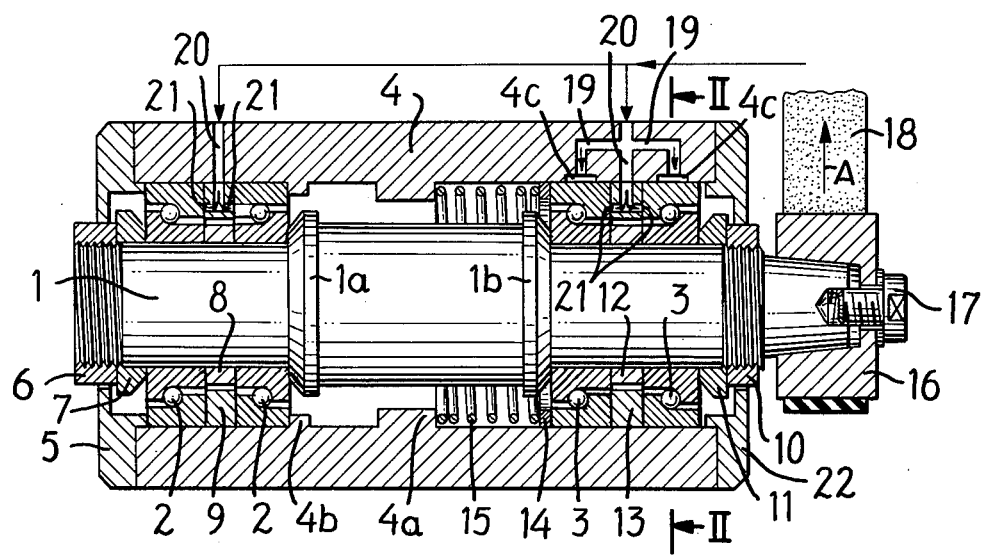
FIG. 1 is an axial section of the bearing device.
Figure 2:
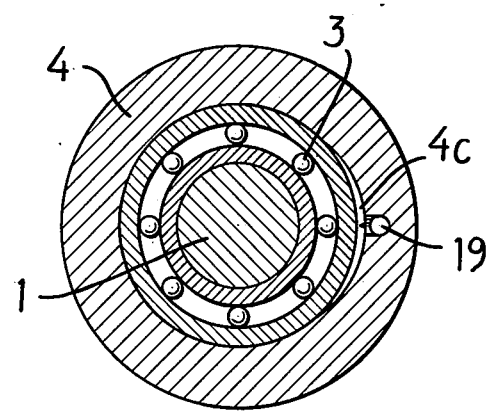
FIG. 2 is a cross section taken approximately on the line II—II in FIG. 1.

As illustrated by way of example in the drawings, a rotary spindle 1 is rotatably supported in a bore of a housing 4 by a set of front bearings 2 and a set of rear bearings 3. The front bearings are held in the housing 4 and are fixed therein by a front cover 5. The rear bearings 3 are held with a proper gap in the bore of the housing 4.

The front set of bearings is shown as comprising two ball bearings 2 which are spaced relative to one another by an annular spacer 8 between the inner races of the bearings 2 and an annular spacer 9 between the outer races. A nut 6 screwed onto the front portion of the spindle 1 acts through a collar 7 to tighten the inner races of the bearings 2 against a shoulder 1a on the spindle. The outer races of the bearings 2 are held between a shoulder 4b in the bore of the housing and the front cover 5.

The rear set of bearings are shown as comprising two ball bearings 3 which are spaced from one another by an annular spacer 12 placed between the inner races of the bearings 3 and an annular spacer 13 placed between the outer races of the bearings. On the rear portion of the spindle 1 there is screwed a nut 10 which acts through a collar 11 to tighten the inner races of the bearings 3 against a shoulder 1b of the spindle. The bearing assembly comprising the bearings 3 and spacers 12 and 13 is slidable axially in the bore of the housing 4. A rear cover 22 is provided at the rear of the housing.

A spring 15 which surrounds the spindle 1 is compressed between an inner shoulder 4a formed in the bore of the housing 4 and a ring 14 which is in contact with an end of the outer race of a rear bearing 3 so as to press the rear bearings 3 backwards. As described above, all of the inner races of the front bearings 2 and rear bearings 3 are securely fixed to the spindle 1. Further the inside end of the outer race of a front bearing 2 is in contact with the inner shoulder 4b of the housing 4 so that the spring force applies a desired spring load to all of the bearings 2 and 3.

The rear end portion of the spindle 1 projects from the housing 4 and a pulley 16 is fixed thereto by a screw 17. A belt 18 runs on the pulley 16 so as to drive the spindle. By reason of the belt drive, the spindle is subjected to a radial load in the direction of the arrow A in FIG. 1.

By reason of the radial load applied to the spindle, the bearings 3 are pressed strongly against one side of the bore in the housing 4 which, except for provisions made by the present invention as will now be described, would result in high friction forces interfering with the free axial sliding of the bearings 3. In order to avoid such friction forces, recess 4c are provided in the wall of the bore of the housing 4 against which the bearings 3 are pressed by belt tension. A pair of passages 19 lead respectively to the recesses 4c for supplying pressurized fluid to the recesses. The passages communicate with an external pressurized fluid supplying device which is not shown in the drawings. Moreover, pressurized fluid is also supplied to passages 20 which communicate with nozzles 21 in the outer spacers 9 and 13 for the bearings 2 and 3. By using lubricating oil or other bearing lubricant as the pressurized fluid, the bearings 2 and 3 are thereby lubricated.

Thus pressurized fluid is supplied to the recesses 4c by the passages 19 for floating the outer races of the bearings 3 against the radial load caused by the tension of the belt 18 thereby decreasing frictional forces so that the bearings slide freely in the bore of the housing 4. Moreover, pressurized fluid is also supplied to the lubricating nozzles 21 through the passages 20 so as to lubricate the bearings.

Therefore, even if the belt tension of the belt 18 is very heavy the outer races of the bearings 3 can move smoothly in an axial direction in response to the thermal expansion of the rotary spindle 1 when the spindle is in operation so that the desired preload is always maintained on the bearings 2 and 3.

As described above, by using a bearing device according to the invention a desired preload is always applied to the bearings regardless of thermal expansion of the spindle in operation so that the spindle can rotate always in good condition so as to suppress violent vibration and avoid bearing life deterioration.

Further, when the pressurized fluid is lubricating oil it serves as a lubricator for the sliding of the outer races of the bearings 3 in the bore of the housing so as to allow very smooth sliding and further damping the bearing vibration by reason of its viscosity.

It will be understood that in FIG. 1 the separation of passages 20 from passages 19 may make it possible to use separate pressurized fluid supplying devices for the respective passages so as to supply one pressurized fluid to recesses 4c and other pressurized fluid for bearing lubrication.

While a preferred embodiment of the invention has been illustrated in the drawings and is herein particularly described, it will be understood that the invention is in no way limited to this embodiment.

What is claimed is:

1. A spindle device comprising a housing having a bore and a front end and a rear end, a plurality of anti-friction radial thrust bearings in said bore comprising a front bearing fixed within said bore and a rear bearing axially slidable in said bore and spaced axially from said front bearing, a spindle rotatably supported by said bearings and having a rear end projecting beyond said housing, the projecting rear end of said spindle being subjected to a radial load in a predetermined radial direction, spring means acting axially on said axially slidable rear bearing and acting through said spindle on said front bearing to give said bearings a selected preload, means defining a recess between said rear bearing and said bore on the side of the bore toward which said rear bearing is pressed by said radial load on said spindle and duct means supplying pressurized lubricant from a common, source to said recess and to said bearings to lubricate said bearings and to apply to said rear bearing a radial force opposing and thereby counteracting said radial load applied to said spindle to facilitate axial movement of said rear bearing in said bore by said spring means.

2. A spindle device according to claim 1, in which said rear bearing comprises two bearing elements each having an inner race and an outer race with a spacer between said bearing elements and having ducts leading to said bearing elements, said recess comprising two portions disposed between said housing and said two outer races respectively, and in which said duct means comprises ducts in said housing leading respectively to said two recess portions and to said duct in said spacer.

3. A spindle device according to claim 1, in which said housing has an annular abutment in said bore between said front and rear bearings and in which said spring means comprises a helical compression spring surrounding said spindle and acting between said abutment and said rear bearing.

4. A spindle device according to claim 1, further comprising a pulley on said projecting rear end of said spindle, said pulley being driven by a belt which applies said radial load to said spindle.

5. A spindle device comprising a housing having a bore and having a front end and a rear end, a plurality of anti-frictino radial-thrust bearings in said bore comprising a rear bearing and a front bearing spaced axially from said rear bearing, a spindle rotatably supported by said bearings, and having a rear end portion projecting beyond said housing, each of said bearings comprising two axially spaced bearing elements each having an outer race, an inner race and rolling elements between said races with inner and outer spacers between said bearing elements, means securing said outer races and outer spacer of said front bearing in fixed axial position relative to said housing bore, means securing said inner races and inner spacer of said front bearing in fixed axial position relative to said spindle, means securing said inner races and said inner spacer of said rear bearing in fixed axial position relative to said spindle, said outer races and outer spacer of said rear bearing being slidable axially in said bore, said housing having an abutment in said bore between said front and rear bearings, compression spring means surrounding said spindle and acting between said abutment and the outer races and outer spacer of said rear bearing to apply a selected preload to said bearings, a pulley on said rear end portion of said spindle, said pulley being driven by a belt that applies to the rear end portion of said spindle a radial load in a predetermined radial direction, each of said outer spacers having a duct leading from the periphery of said spacer to said rolling elements of said bearings, means defining a recess between the periphery of the outer race of each of said bearing elements of said rear bearing and said housing on the side of said bore toward which said rear bearing is pressed by the radial load applied by said belt, and ducts in said housing leading from a common supply of pressurized lubricant to said recesses and to said ducts of said outer spacers to lubricate said bearings and to apply to said rear bearing a radial force opposing and thereby counteracting said radial load applied by said belt to the rear end portion of said spindle to facilitate axial movement of said rear bearing in said bore by said spring means.

* * * * *